(12) United States Patent
Broadhead et al.

(10) Patent No.: US 7,287,961 B2
(45) Date of Patent: Oct. 30, 2007

(54) RETAINING ARRANGEMENT

(75) Inventors: Peter Broadhead, Derby (GB); John Hoptroff, Derby (GB)

(73) Assignee: Rolls-Royce plc, London (GB)

( * ) Notice: Subject to any disclaimer, the term of this patent is extended or adjusted under 35 U.S.C. 154(b) by 305 days.

(21) Appl. No.: 10/916,442

(22) Filed: Aug. 12, 2004

(65) Prior Publication Data
US 2005/0095136 A1 May 5, 2005

(30) Foreign Application Priority Data
Aug. 21, 2003 (GB) .................. 0319607.8

(51) Int. Cl.
*F01D 5/30* (2006.01)
(52) U.S. Cl. .............. 416/220 R; 416/244 R
(58) Field of Classification Search ............ 416/204 A, 416/220 R, 244 A; 29/889.21
See application file for complete search history.

(56) References Cited

U.S. PATENT DOCUMENTS

| 4,192,633 A | * | 3/1980 | Herzner ...................... 416/221 |
| 4,304,523 A | * | 12/1981 | Corsmeier et al. .......... 416/221 |
| 4,668,167 A | * | 5/1987 | Le Mao/u/ t et al. ......... 416/95 |
| 5,320,492 A | * | 6/1994 | Bouru et al. ............. 416/220 R |
| 5,330,324 A | * | 7/1994 | Agram et al. ........... 416/220 R |
| 5,601,407 A | | 2/1997 | Humhauser |
| 6,283,712 B1 | * | 9/2001 | Dziech et al. .............. 416/179 |
| 6,520,743 B2 | * | 2/2003 | Arilla et al. ............ 416/220 R |
| 7,040,866 B2 | * | 5/2006 | Gagner ................... 416/220 R |

\* cited by examiner

*Primary Examiner*—Edward K. Look
*Assistant Examiner*—Devin Hanan
(74) *Attorney, Agent, or Firm*—W. Warren Taltavull; Manelli Denison & Selter PLLC

(57) ABSTRACT

A retaining arrangement for joining together two components such as a rim coverplate 10 and a rotor disc 12 in a gas turbine engine. The arrangement comprising a channel 54 formed by respective formations 26, 52 on the disc 12 and coverplate 10, which channel 54 locates one or more annular ring member 66 which prevents relative axial movement therebetween. Engageable abutment formations 18, 46 are provided respectively on the disc 12 and coverplate 10, to prevent relative pivotal movement.

13 Claims, 4 Drawing Sheets

US 7,287,961 B2

RETAINING ARRANGEMENT

FIELD OF THE INVENTION

This invention concerns a retaining arrangement for joining together two components, and particularly but not exclusively such an arrangement for joining together two components where at least one has a generally annular configuration, and especially an arrangement for joining together two components in a gas turbine engine.

BACKGROUND OF THE INVENTION

Conventionally in a gas turbine engine, components such as rim coverplates or sealplates are attached to rotor discs using bayonet action type fixings with locking features or other similar arrangements. These arrangements however tend to produce high windage features on the rotor disc surface. Furthermore such arrangements can be difficult to assemble and disassemble, and generally require significant milling operations during manufacture.

SUMMERY OF THE INVENTION

According to a first aspect of the present invention there is provided a retaining arrangement for joining together two components, the arrangement comprising respective channel forming formations on each component which are cooperable when the components are in a required relative position for joining together, to define an annular channel, a ring member slidably locatable in said annular channel, and respective abutment formations on each component, which abutment formations are engageable, when the components are in said required relative position with the ring member in the channel, to prevent separation of the components.

According to a second aspect of the present invention there is provided a retaining arrangement for joining together two components with at least one of the components having a generally annular configuration, the arrangement comprising respective channel forming formations on each component which are cooperable when the components are in a required relative position for joining together, to define an annular channel substantially coaxial with said one component, a ring member slidably locatable in said annular channel, and respective abutment formations on each component, which abutment formations are engageable, when the components are in said required relative position with the ring member in the channel, to prevent separation of the components.

According to a third aspect of the present invention there is provided a retaining arrangement for joining together two components in a gas turbine engine, with at least one of the components having a generally annular configuration substantially coaxial with the engine axis, the arrangement comprising respective channel forming formations on each component which are cooperable when the components are in a required relative position for joining together, to define an annular channel substantially coaxial with said one component, a ring member slidably locatable in said annular channel, and respective abutment formations on each component, which abutment formations are engageable, when the components are in said required relative position with the ring member in the channel, to prevent separation of the components.

The ring member preferably has at least one break in its length, and may be formed in a plurality of sections along its length.

A plurality of ring members may be provided locatable coaxially adjacent each other in the channel.

The or each ring member may be formed from a length of strip material, with greater radial than axial dimensions.

An opening formation may be provided in one or both of the components to provide an axial opening into the channel to permit a ring member to be threaded into the channel. A plurality of openings may be provided, which openings are preferably arranged diametrically opposite one another.

Formations, such as holes, may be provided adjacent an end or ends of the ring member or members, and/or along the length thereof, to assist engagement with the ring member to permit sliding thereof through the channel.

A formation may be provided on an end of a ring member to prevent said end sliding past an opening in the channel.

The abutment formations may comprise an annular recess in one component with a substantially axial opening, in which recess a projection on the other component is slidingly locatable. The abutment formations are preferably configured so as to when engaged, substantially prevent relative pivotal movement between the components.

The invention further provides a method of joining together two components, the method comprising using a retaining arrangement according to any of the preceding ten paragraphs.

A plurality of ring members of different thicknesses may be provided, and one or more ring members of a required thickness or thicknesses may be chosen to provide a required sliding fit in the channel.

BRIEF DESCRIPTION OF THE DRAWINGS

An embodiment of the present invention will now be described by way of example only and with reference to the accompanying drawings, in which.

DETAILED DESCRIPTION OF THE INVENTION

Figure 1:
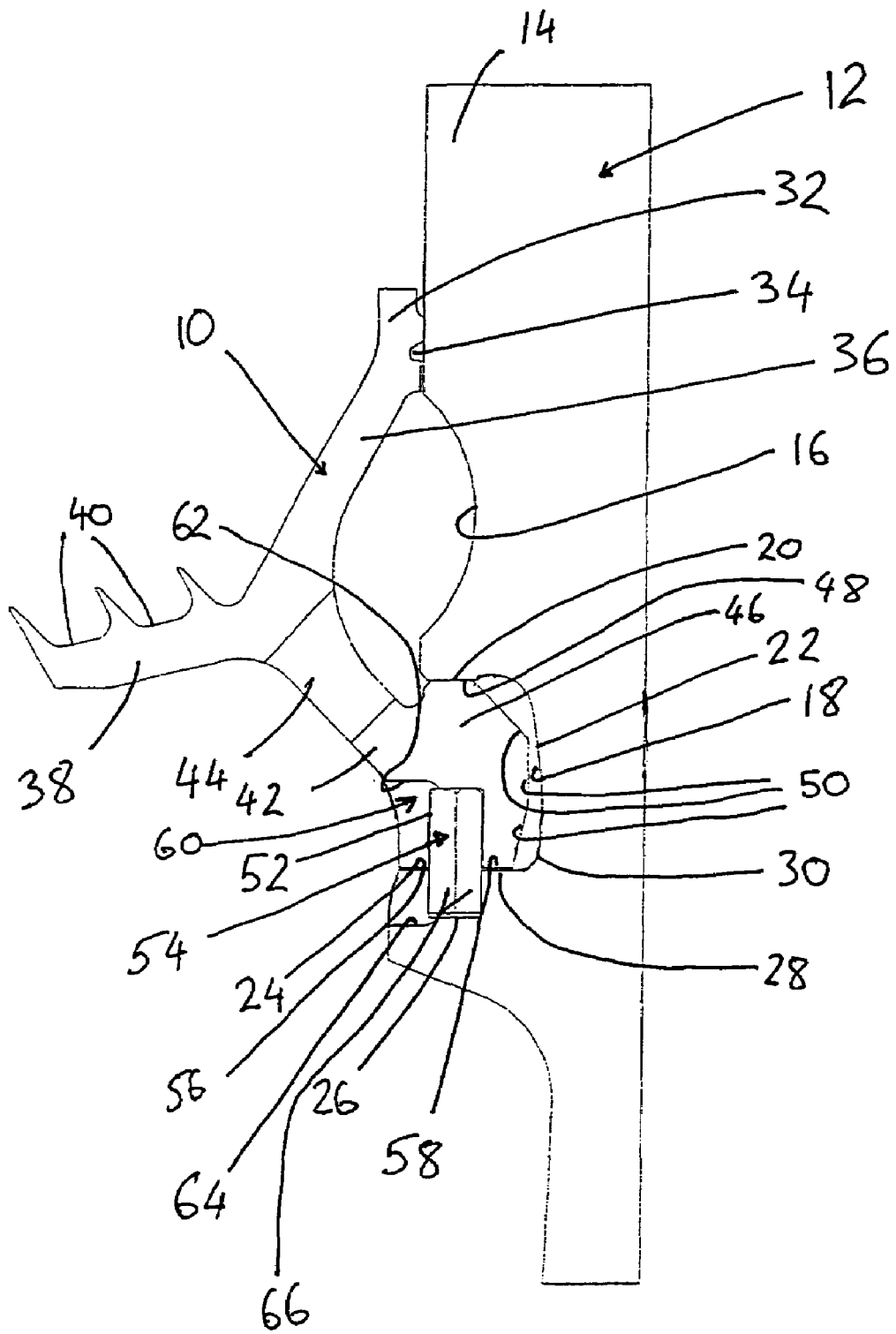
FIG. 1 is a diagrammatic cross-sectional view of part of a retaining arrangement according to the invention.

The drawings show an arrangement for mounting a rim coverplate 10 on the rotor disc 12 of a gas turbine engine. In cross-section moving radially inwards, the disc 12 comprises an outer portion 14 leading to an arcuate annular recess 16. A further deeper recess 18 is provided which forms the abutment formation on the disc 12. The radially outer face of the recess 18 has an initial axial section 20 with a slightly enlarged inner part 22. The radial inner wall of the recess 18 is defined by an outer axial section 24, a radial slot 26 which provides the channel forming formation of the rotor disc 12, and a further axial section 28 leading to a curved end wall of the recess 30.

Moving radially inwardly from the outer edge of the coverplate 10 there is provided a first portion 32 with a recess 34, which first portion 32 is engageable against the outer portion 14. An inclined section 36 extends inwardly and away from the rotor disc 12. A further inclined section 38 extends from the section 36 at a greater angle to the rotor disc 12 and provides two outwardly facing slots 40. Also extending from the end of the section 36 is an inclined portion 42 facing towards the radially inner part of the recess 16. The portion 42 is provided with a plurality of circular openings 44 therein. A profiled part 46 is provided on the end of the inclined portion 42. The part 46 has a circumferential face 48 engageable against the section 20, leading to three inclined end faces 50. An inwardly facing slot 52 is provided in the profiled part 46, which slot 52 forms the channel forming formation of the coverplate 10. Together the slots 26 and 52 form an annular channel 54. Either side of the slot 52 are inwardly facing circumferential faces 56, 58 which are engageable respectively against the sections 24 and 28.

Figure 4:
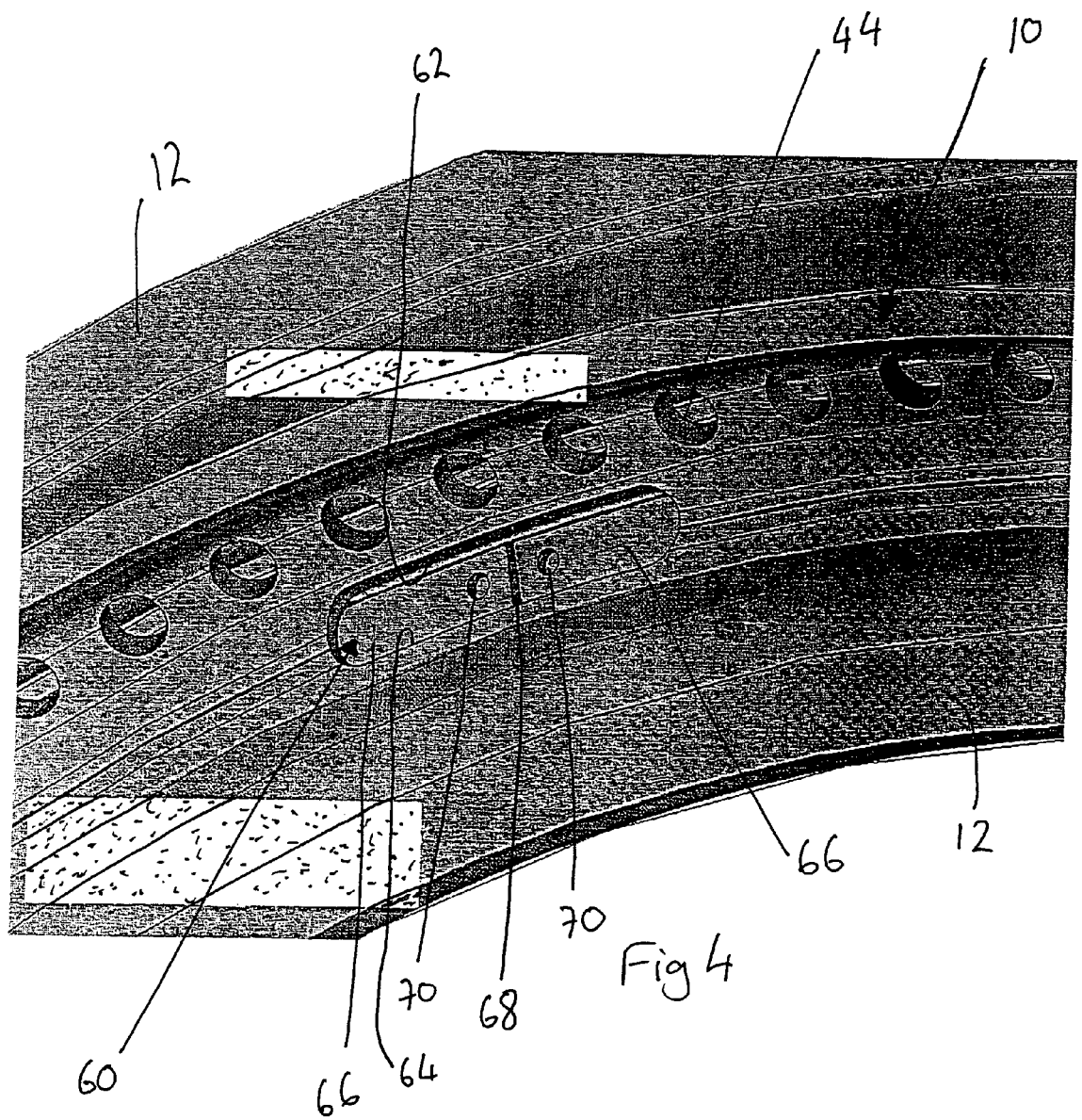
FIG. 4 is a diagrammatic perspective side view of part of the apparatus of FIG. 1.

Two diametrically opposite openings 60 (only one of which is shown in FIGS. 1 and 4) are provided in the annular channel 54. The openings 60 are provided by respective opening formations 62, 64 in the profiled part 46 and the section 24. Located in the annular channel 54 is a pair of ring members 66. Each ring member 66 is in the form of an annular ring with one break 68 therein, with a hole 70 adjacent each end of the ring member 66. The ring members 66 are formed from strips of for instance steel, with a greater radial than axial dimension, and the ring members 66 are located coaxially adjacent each other.

In use, the retaining arrangement is assembled as follows. The coverplate 10 is located on the rotor disc 12 with the profiled part 46 located in the recess 18. The ring members 66 are sequentially fed through one of the openings 60 until they are fully in the channel 54. The holes 70 can be used to facilitate movement of the ring members 66 when being threaded into, or if required out of, the openings 60. Once assembled the combination of the engagement of the ring members 66 in the channel 54 stopping relative axial movement, and the profiled part 46 in the recess 18 stopping relative pivotal movement, prevents separation of the coverplate 10 from the rotor disc. If separation is required the ring members 66 can be slid out of the channel 54 through one of the openings 60.

There is thus described a retaining arrangement and a method of retention, which provide significant advantages relative to prior arrangements. A much smoother rotor face is provided and hence less windage effects are encountered. The arrangement is relatively easy to assemble and disassemble. The manufacture of this arrangement is relatively straightforward and hence inexpensive, and particularly due to the avoidance of significant milling operations. The use here of two ring members allows for good milling proportions to be chosen.

Whilst the invention has been described in terms of retaining a rotor disc on a coverplate, it is to be realised that such an arrangement could be used in a wide range of applications and particularly for retaining together, or retaining components on, an annular component in a gas turbine engine. Such arrangements could be applied to both static and rotating parts, such as seals, sealplates, coverplates and for use in blade retention.

Figure 2:
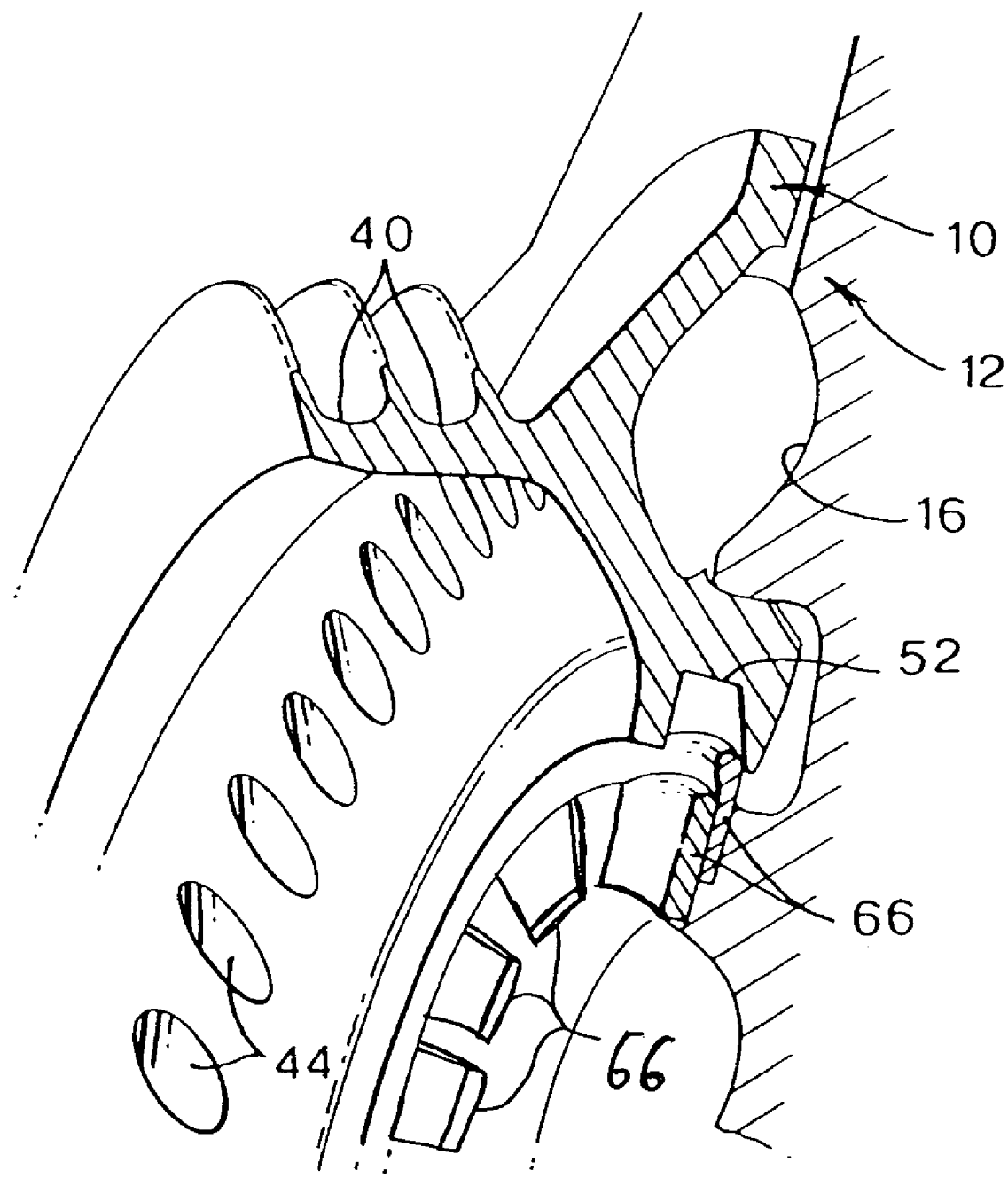
FIGS. 2 and 3 are different angle perspective sectional views of parts of the apparatus of FIG. 1.
Figure 3:
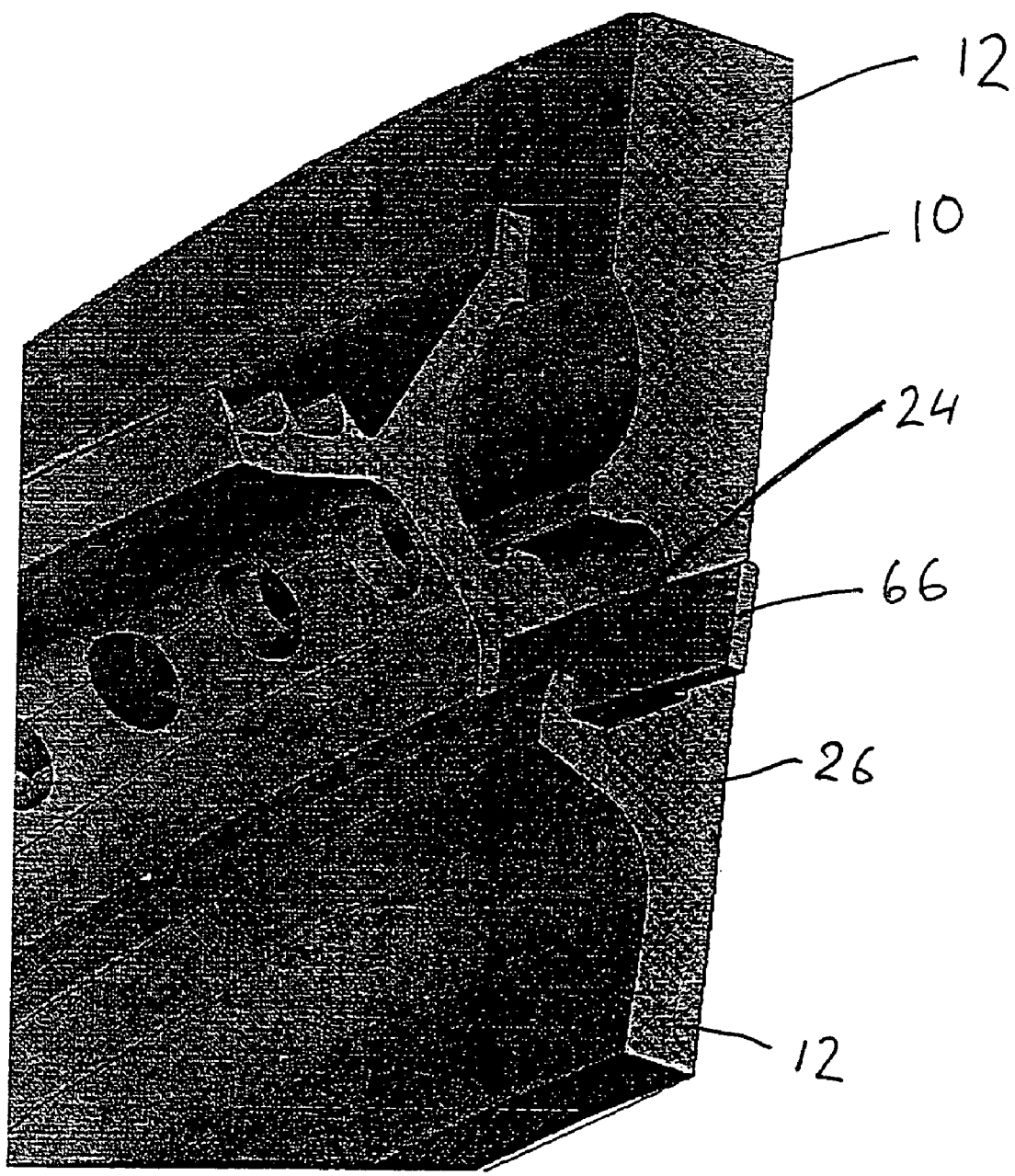

Various modifications may be made without departing from the scope of the invention. For instance a different number of ring members could be used, and a selection of different size ring members could be provided with appropriate members being selected dependent on the size of the channel. The ring members may be formed of separate sections, as illustrated in FIG. 2 and could for instance be in two, three or four parts. Openings or other formations could be provided along the length of the ring members to facilitate movement thereof. A projection or other formation could be provided on an end of a ring member to prevent rotation thereof beyond a one of the openings. It may be possible to only provide one opening, or more openings may be provided. It is generally advantageous to provide diametrically opposite openings to avoid any imbalance.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A retaining arrangement for joining together two components, the arrangement comprising respective channel forming formations on each component which are cooperable when the components are in a required relative position for joining together, a radially inner slot and a radially outer slot which cooperate to define an annular channel, a ring member slidably locatable in said annular channel, said annular channel including at least one opening in order to provide access to the interior of said annular channel and said ring member, and a recess in at least one of said components to receive respective abutment formations on each component, which abutment formations are engageable, when the components are in said required relative position with the ring member in the channel, to prevent separation of the components wherein the outer surface of both components when joined is substantially flush in order to reduce windage effects during use.

2. An arrangement according to claim 1, in which the ring member has at least one break in its length.

3. An arrangement according to claim 1, in which a plurality of ring members are provided locatable coaxially adjacent each other in the channel.

4. An arrangement according to claim 1, in which the ring member is formed from a length of strip material, with greater radial than axial dimensions.

5. An arrangement according to claim 1, in which the opening in the annular channel is provided to permit the ring member to be threaded into the annular channel.

6. An arrangement according to claim 1, in which formations are provided adjacent an end of the ring member, and along the length thereof, to assist engagement with the ring member to permit sliding thereof through the channel.

7. An arrangement according to claim 1, in which the abutment formations are configured so as to when engaged, substantially prevent relative pivotal movement between the components.

8. A method of joining together two components, the method comprising using a retaining arrangement according to claim 1.

9. A method according to claim 8, in which a plurality of ring members of different thicknesses are provided, and at least one ring member of a required thickness is chosen to provide a required sliding fit in the channel.

10. A retaining arrangement for joining together two components with at least one of the components having a generally annular configuration, the arrangement comprising respective channel forming formations on each component which are cooperable when the components are in a required relative position for joining together, a radially inner slot and a radially outer slot which cooperate to define an annular channel substantially coaxial with said one component, a ring member slidably locatable in said annular channel, said annular channel including at least one opening in order to provide access to the interior of said annular channel and said ring member, and a recess in at least one of said components to receive respective abutment formations on each component, which abutment formations are engageable, when the components are in said required relative position with the ring member in the channel, to prevent separation of the components wherein the outer surface of both components when joined is substantially flush in order to reduce windage effects during use.

11. A retaining arrangement for joining together two components in a gas turbine engine, with at least one of the components having a generally annular configuration substantially coaxial with the engine axis, the arrangement comprising respective channel forming formations on each component which are cooperable when the components are in a required relative position for joining together, a radially inner slot and a radially outer slot which cooperate to define an annular channel substantially coaxial with said one component, a ring member slidably locatable in said annular channel, said annular channel including at least one opening in order to provide access to the interior of said annular channel and said ring member, and a recess in at least one of said components to receive respective abutment formations on each component, which abutment formations are engageable, when the components are in said required relative position with the ring member in the channel, to prevent separation of the components wherein the outer surface of both components when joined is substantially flush in order to reduce windage effects during use.

12. A retaining arrangement for joining together two components, the arrangement comprising respective channel forming formations on each component which are cooperable when the components are in a required relative position for joining together, to define an annular channel, a ring member slidably locatable in said annular channel, and respective abutment formations on each component, which abutment formations are engageable, when the components are in said required relative position with the ring member in the channel, to prevent separation of the components wherein the ring member has at least one break in its length and is formed in a plurality of sections along its length.

13. A retaining arrangement for joining together two components, the arrangement comprising respective channel forming formations on each component which are cooperable when the components are in a required relative position for joining together, to define an annular channel, a ring member slidably locatable in said annular channel, and respective abutment formations on each component, which abutment formations are engageable, when the components are in said required relative position with the ring member in the channel, to prevent separation of the components wherein an opening formation is provided in at least one of the components to provide an axial opening into the channel to permit a ring member to be threaded into the channel wherein a plurality of openings are provided, which openings are arranged diametrically opposite one another.

* * * * *